United States Patent

Nilsson et al.

[11] 3,713,303
[45] Jan. 30, 1973

[54] MEANS FOR BREAKING DOWN AQUEOUS JELLY-LIKE SOLUTIONS AND THUS SEPARATING WATER AND SOLID CONSTITUENTS FROM EACH OTHER BY MEANS OF FREEZING AND SUBSEQUENT MELTING

[75] Inventors: Nils Edvin Folke Nilsson; Jimmie Arne Eurenius, both of Norrkoping, Sweden

[73] Assignee: Stal Refrigeration AB, Norrkoping, Sweden

[22] Filed: Jan. 18, 1971

[21] Appl. No.: 107,346

[30] Foreign Application Priority Data

Jan. 22, 1970    Sweden ......................... 743/70

[52] U.S. Cl. ........................... 62/123, 62/58, 62/67
[51] Int. Cl. ............................................ B01d 9/04
[58] Field of Search ........ 62/58, 59, 67, 69, 70, 123, 62/124

[56] References Cited

UNITED STATES PATENTS

| | | |
|---|---|---|
| 2,595,588 | 5/1952 | Lee et al. ........................ 62/344 X |
| 3,079,761 | 3/1963 | Toulmin, Jr. ...................... 62/67 X |
| 3,319,437 | 5/1967 | Goins ............................... 62/123 |
| 3,347,058 | 10/1967 | Svanoe ........................... 62/123 X |
| 3,501,275 | 3/1970 | Sailer et al. ..................... 62/123 X |

Primary Examiner—Meyer Perlin
Assistant Examiner—Ronald C. Capossela
Attorney—Munson & Fiddler

[57] ABSTRACT

In order to break down aqueous jelly-like solutions and thus separate water and solid constituents from each other, the solution is first frozen and then melted. Means for this comprises two similar heat-exchangers operating alternately as vaporizer and condenser for a cooling plant and the solution is frozen in the vaporizer and melted in the condenser. Each heat-exchanger comprises tubes arranged in a casing between two end chambers. The solution is frozen in the tubes and air is blown through the tubes to remove any unfrozen solution before melting.

3 Claims, 4 Drawing Figures

NILS EDVIN FOLKE NILSSON
and JIMMIE ARNE EURENIUS
*INVENTORS*

BY  MUNSON & FIDDLER

MEANS FOR BREAKING DOWN AQUEOUS JELLY-LIKE SOLUTIONS AND THUS SEPARATING WATER AND SOLID CONSTITUENTS FROM EACH OTHER BY MEANS OF FREEZING AND SUBSEQUENT MELTING

The present invention relates to a means for breaking down aqueous jelly-like solutions and thus separate water and solid constituents from each other by means of freezing and subsequent melting, comprising two substantially similar heat-exchangers as part of a compressor cooling plant, these being arranged to operate alternately as vaporizer and condenser for coolant circulating in the plant, the solutions being alternately frozen and melted. The invention is characterized substantially by a means hereinafter more particularly set forth.

Figure 1:
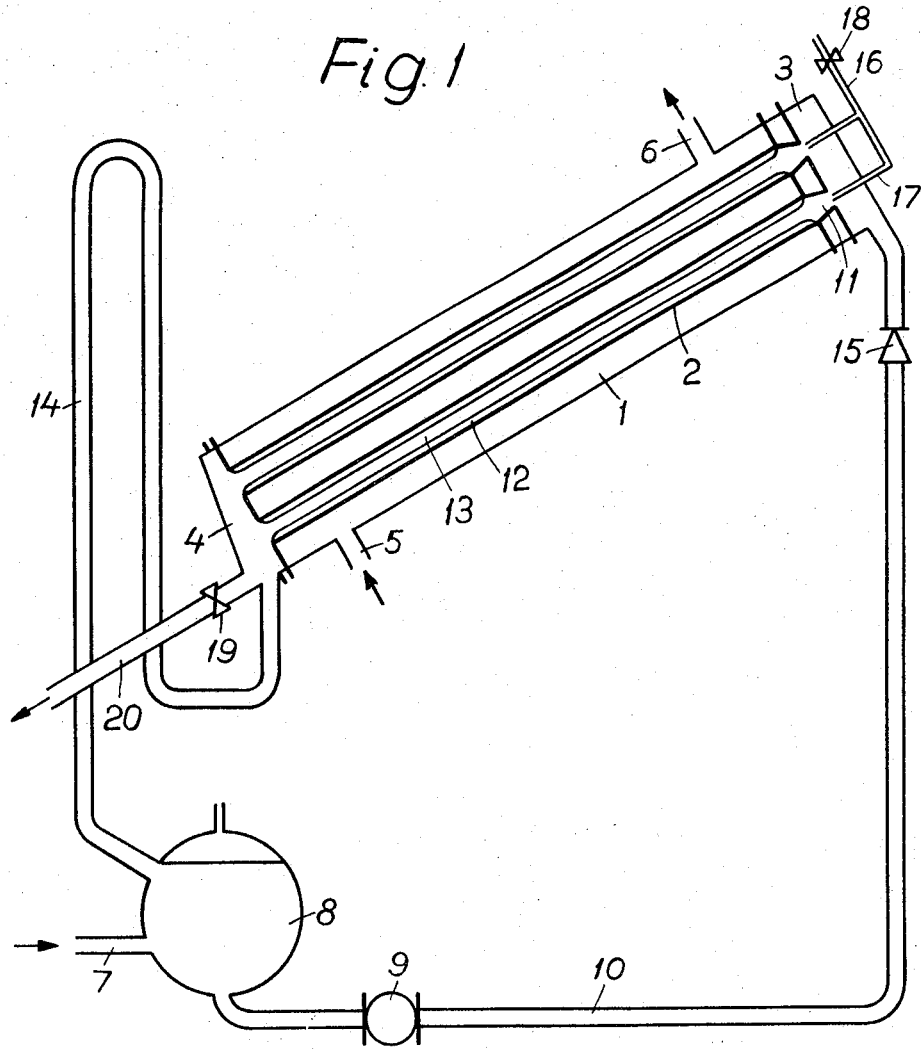
Figure 2:
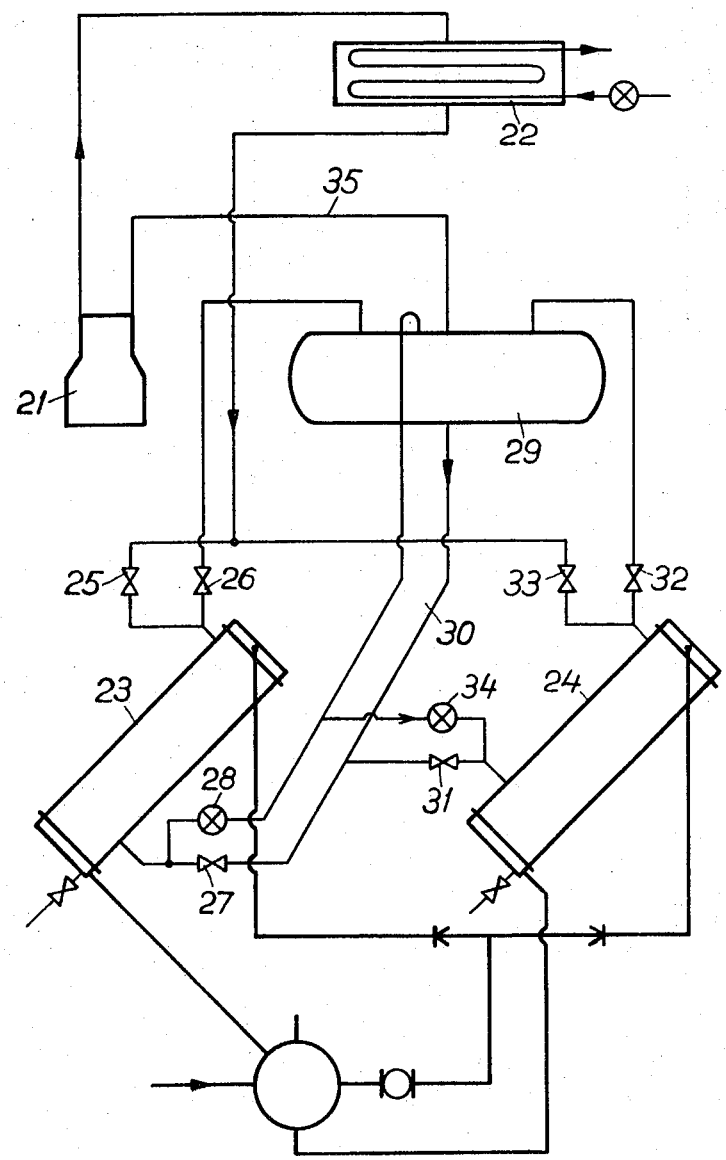
Figure 3:
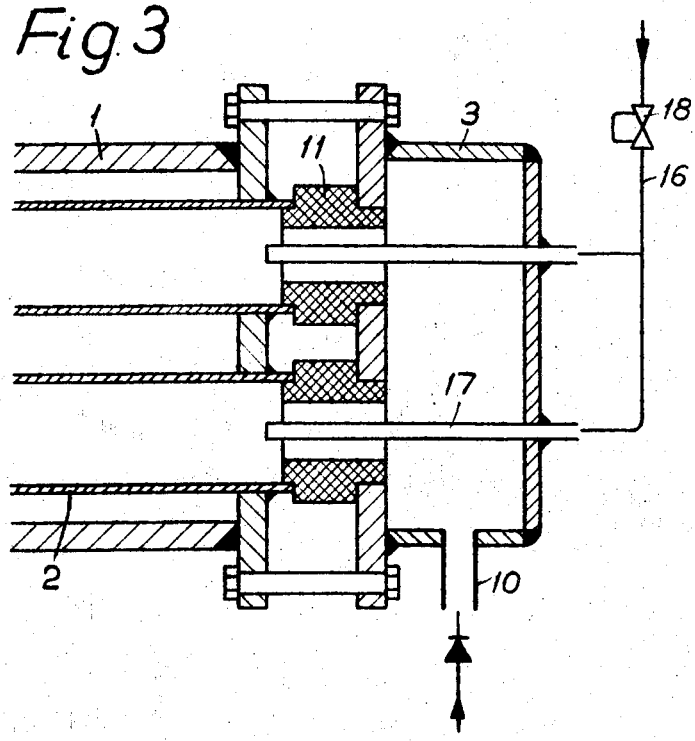
Figure 4:
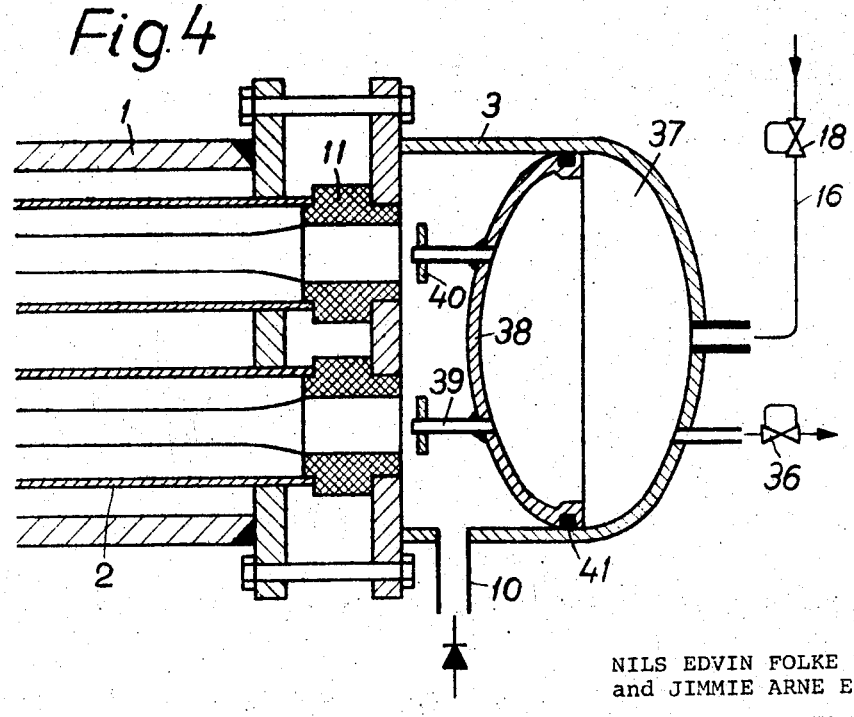

The invention is illustrated schematically in the accompanying drawings in which FIG. 1 shows a heat-exchanger, FIG. 2 shows diagrammatically the heat-exchangers as arranged in a cooling plant, and FIG. 3 and 4 each shows one form of one end of a heat-exchanger.

1 designates a heat-exchanger having tubes 2 between two headers or end chambers 3, 4, around which tubes a coolant, for example $NH_3$, is vaporized while absorbing heat from the tubes. The coolant circulates in known manner in a cooling plant having compressor and condenser and in which the heat-exchanger forms a vaporizer. The coolant flows to the heat-exchanger through a conduit 5 and leaves it through a conduit 6.

The sludge or jelly-like solution or compound to be frozen is pumped continuously or intermittently through a conduit 7 into a container 8 which serves as accumulator for intermittent freezing. The solution is pumped by a pump 9 from the container 8 through a conduit 10 to the end chamber 3.

The end chamber 3 is in communication with the tubes 2 by means of distributor nozzles 11 through which the tubes are filled with solution jelly-like.

When the tubes have been filled, freezing of the solution is initiated and continues until a certain layer 12 of the solution has frozen on the inside of the tubes and string 13 of unfrozen solution is formed along the tubes. During the freezing process, there is an increase in volume and solution is forced back to the container 8 through a conduit 14. Reverse flow of solution through conduit 10 is prevented by a one-way, i.e. valve 15.

When a desired or predetermines layer has frozen, the tubes and chamber 4 are blown free from unfrozen solution, and the latter flows to the container 8. The air for such freezing of unfrozen solution is supplied through a conduit 16 and is distributed to the various tubes through nozzles 17. A non-return valve 18 prevents the solution from flowing reversely through the conduit 16 when air is not being supplied thereto.

As is clear from the following, the tubes are then heated and when the frozen solution has melted, a valve 19 is in an outlet conduit 20 is opened and the melted solution can flow out of the heat-exchanger through conduit 20.

The conduit 14 extends upwardly in a loop above the highest point of the heat-exchanger, like a water lock, so that the melted solution does not flow directly to the container 8.

It is necessary in the carrying out of the process that all solution which is melted must first have been frozen, i.e. there may not be any unfrozen solution remaining when the melting process is started. Blowing the central parts of the tubes with air prevents any unfrozen solution remaining in the central parts of the tubes and also prevents the tubes from bursting.

FIG. 2 shows a compressor cooling plant for freezing and melting the solution. As illustrated, it comprises a compressor 21, an auxiliary condenser 22 and two heat-exchangers 23, 24, through which the coolant flows in series. The heat-exchangers 23, 24, are each arranged to operate alternately as vaporizer to freeze the solution, and as condenser to melt it.

The compressed coolant is taken from the compressor 21 through the auxiliary condenser 22 and valve 25 to the heat-exchanger 23 which then acts as condenser to melt the solution. Valves 26, 27 are then closed. The condensed coolant expands in an expansion valve 28 and is led to a separator 29. From this, the cold coolant is led through a downwardly sloping conduit 30 and a valve 31 to the heat-exchanger 24 which now acts as freezing apparatus for the solution. The coolant is vaporized while taking up heat from the solution and is led through a valve 32 to the separator 29. A valve 33 and an expansion valve 34 are then closed. From the separator 29 the coolant gas is led back to the compressor 21 through a conduit 35.

Since the quantity of heat given off in the cooling process during condensation is greater than the quantity which is taken up during vaporization, the melting heat in the heat-exchanger 23 is not sufficient for condensation, and thus there is not a sufficient amount of freezing in the heat-exchanger 24. In order to remedy this, the auxiliary condensor 22 is connected on the condensing side of the cooling system. This is connected as soon as the condensation pressure has reached a certain value.

The heat-exchangers and their valves are exactly alike. The valves may be manually operated or automatically controlled, for example by a time relay.

The amount of freezing controls the process, and when sufficient solution in the heat-exchanger 24 has frozen, the valves 25, 26, 27, 28 or 33, 32, 31, 34, respectively, are switched to opposite conditions, so that the heat-exchangers 23, 24 exchange function, i.e., from freezers to vaporizers, or vice versa.

FIG. 3 shows an end chamber or header 3 from which air and viscous solution are distributed to the tubes 2 in the heat-exchanger 1, as well as the arrangement acting as heat-insulating part so that the solution is prevented from freezing in the distributor nozzles or in their vicinity. Between the end chamber and the heat-exchanger there is, for each tube, a distributor nozzle 11 of a material having poor heat conductivity, for example, plastic, ceramic, or the like. The nozzles 11 are designed so that air can freely circulate around them. Through these nozzles are inserted conduits 17 to blow in air. The operation may be intermittent or continuous, since the pumping through of the solution is only interrupted during the blowing operations.

In the embodiment shown in FIG. 4, solution is introduced through the conduit 10 and end chamber 3 to the nozzle 11. When the solution has frozen to a desired or predetermined extent in the tubes, they are blown free from unfrozen solution. This is done by closing a valve 36 and opening the valve 18 to lead compressed air to a space 37 having a displacable wall 38 provided having nozzles 39 with sealing washers 40. When compressed air is supplied as described the wall 38 with its nozzles is pressed against the nozzles 11. The washers 40 prevent air from entering the end chamber 3. When the blowing process is finished, the valve 18 is closed and the valve 36 opened and when fresh solution enters, the wall 38 is pressed back to its original position. Between the end chamber wall 37 and the wall 38 there is positioned a seal 41, for example, an O-ring seal.

We claim:

1. An apparatus for treating an aqueous jelly-like solution to separate from each other the water and the solid constituents of said solution, said apparatus comprising:
  a. a container for a supply of said solution;
  b. a pair of spaced heat-exchangers, each of said heat-exchangers comprising an elongated casing having a plurality of tubes mounted to extend axially therewithin in circumferentially spaced relation and to terminate at the respective ends of the tubes in an inlet chamber at one end of the casing and in an outlet chamber at the other end of the casing, said casing being provided with an inlet conduit adjacent one end thereof and with an outlet conduit adjacent the other end thereof, the spaces between said casing and said tubes being sufficient to permit passage of fluid coolant entering through said inlet conduit and discharged through said outlet conduit, said chambers and said tubes of each of said Heat-exchangers being arranged and adapted for passing said jelly-like solution therethrough;
  c. compressor and condenser means for said coolant, disposed in series with said heat-exchanges;
  d. controlled valve means for passing said jelly-like solution and said coolant through said tubes and through said spaces, respectively, of each of said heat-exchangers, whereby each of said heat-exchangers serves alternately in one cycle as freezer of said solution and in a second cycle as vaporizer to melt said frozen solution;
  e. an overflow conduit having the form of a water trap connecting one of said chambers of each of said heat-exchangers with said container;
  f. means for blowing air through said tubes of each of said heat-exchangers at the end of each freezing cycle in each of said heat-exchangers whereby to free said tubes from unfrozen solution before the next succeeding melting cycle in the respective heat-exchangers; and
  g. a valved discharge conduit connected to one end chamber of each of said heat-exchangers for permitting flow through said conduit during said melting cycle in each of said heat-exchangers.

2. An apparatus as defined in claim 1, wherein a distributor nozzle of thermally insulated material for admitting said solution to each of said tubes is disposed in one of said chambers of each heat-exchanger, and wherein a conduit for the supply of air to the tube extends through each nozzle.

3. An apparatus as defined in claim 2, wherein each of said last-named conduits for the supply of air is attached to a displaceable wall in the end chamber, said wall being provided with washers to seal said nozzles when the wall is displaced towards said nozzles, whereby to seal said nozzles with respect to the end chamber when air is supplied to said tubes, thereby to interrupt feeding of said solution to said tubes before said next succeeding melting cycle.

* * * * *